KAMEKICHI SHIBA   INVENTOR

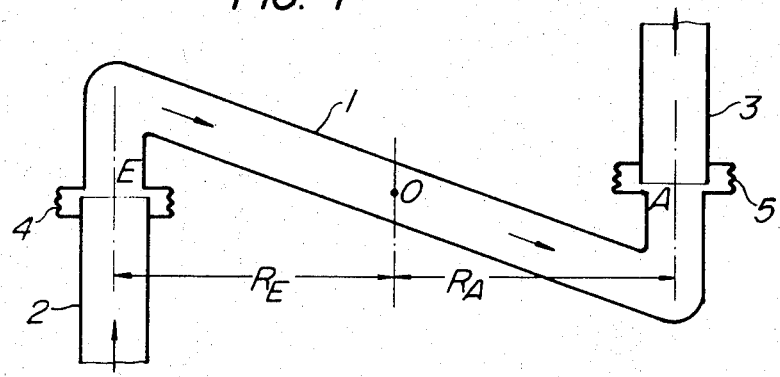
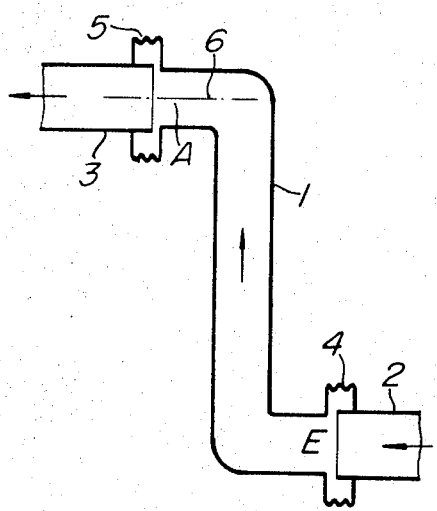
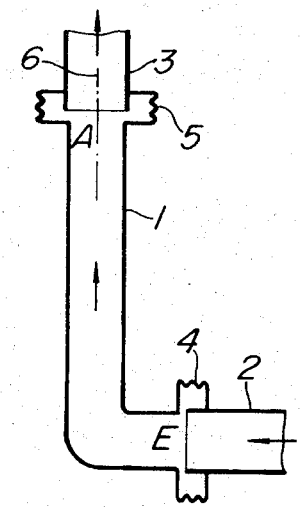

BY Hall, Pollock + Vande Sande

ATTORNEY

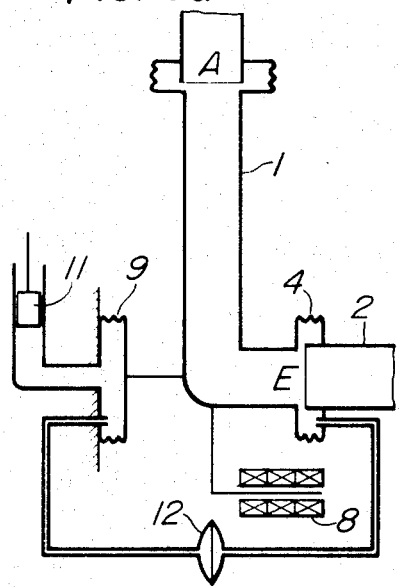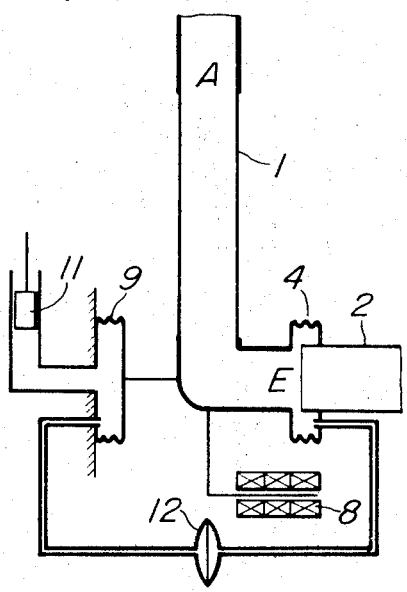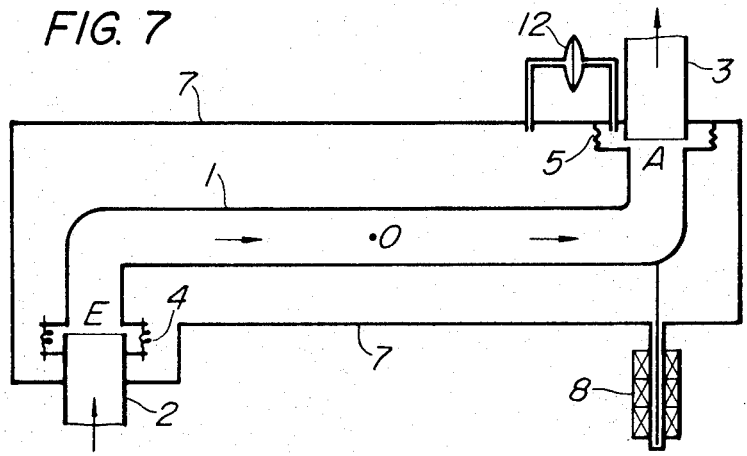

3,538,769
MOVABLE TUBE FLOWMETER OF ANGULAR MOMENTUM TYPE
Kamekichi Shiba, 9–23 Moto-Komagome 6-chome,
Bunkyo-ku, Tokyo, Japan
Filed Oct. 9, 1967, Ser. No. 673,679
Claims priority, application Japan, Oct. 14, 1966,
41/67,164
Int. Cl. G01f *1/00, 15/02*
U.S. Cl. 73—228          10 Claims

ABSTRACT OF THE DISCLOSURE

A movable tube flowmeter of angular momentum type having a movable tube connected to stationary pipes by flexible joint means through which a fluid can freely flow. The movable tube is capable of making rotary displacement about a fixed axis in response to variation in the angular momentum of a fluid flowing through the tube so that the resulting rotary displacement of the tube is utilized to measure the flow rate of the fluid independently of the viscosity of the fluid.

---

This invention relates to flowmeters and more particularly to a movable tube flowmeter which is based on a novel principle such that variation in the angular momentum of a fluid flowing through a movable tube is utilized for the measurement of the flow rate of the fluid.

It is the primary object of the present invention to provide a novel flowmeter of the kind described above by which the flow rate of a fluid can be effectively and accurately measured in spite of its simple structure.

The above and other objects, advantages and features of the present invention will become apparent from the following description with reference to the accompanying drawings; in which:

FIG. 1 is a diagrammatic view showing the basic principle of flow rate measurement in accordance with the present invention;

FIGS. 2a and 2b are diagrammatic views showing basic embodiments of the flowmeter according to the present invention; and FIGS. 3 to 11 are diagrammatic views showing various other embodiments according to the present invention.

Figure 3:
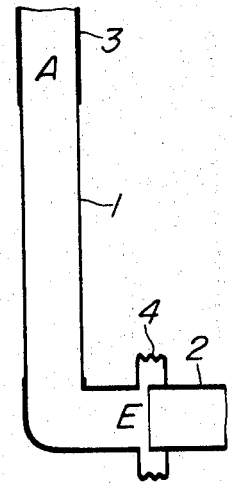

The flowmeter according to the present invention comprises a main tube which can make rotary displacement or swinging movement about a fixed axis and has straight inlet and outlet tube portions which are connected to stationary pipes by means such as bellows. The flowmeter is so constructed that the angular momentum, about the fixed axis, of a fluid of unit mass at the inlet end of the movable tube is not equal to the angular momentum, about the same fixed axis, of the fluid of unit mass at the outlet end of the movable tube when the fluid flows through the movable tube in the form of a steady flow. In the present invention, the flowing direction of the incoming fluid may differ from the flowing direction of the outgoing fluid, or the incoming fluid and the outgoing fluid may flow in the same direction in parallel with each other. The fixed axis about which the movable tube makes its rotary displacement may preferably be perpendicular with respect to the directions of flow of the incoming fluid and outgoing fluid.

Referring now to FIG. 1, the basic principle according to the present invention will be described, in which it is assumed that the incoming flow and outgoing flow occur in the plane defined by the plane of the drawing. The flowmeter comprises a main tube 1 having straight inlet and outlet tube portions which are connected with stationary pipes 2 and 3 by means of bellows 4 and 5, respectively. The intersection between the plane of the drawing and the fixed axis about which the main tube 1 makes its rotary displacement is designated by a reference character O, and the inlet and outlet ends of the inlet and outlet tube portions of the main tube 1 and herein designated by respective reference characters E and A. The bellows 4 is coaxial with the straight inlet tube portion of the main tube 1, while the bellows 5 is also coaxial with the straight outlet tube portion of the main tube 1.

Suppose now that the axes of the straight inlet and outlet tube portions of the main tube 1 are spaced respective distances $R_E$ and $R_A$ from the fixed axis of rotary displacement; the inlet and outlet ends E and A have respective sectional areas $S_E$ and $S_A$; the bellows 4 and 5 have respective effective areas $S_E^*$ and $S_A^*$; and a fluid has respective velocities $V_E$ and $V_A$, and respective pressures $P_E$ and $P_A$ at the inlet and outlet ends E and A. Suppose further that the fluid has a density $\rho$ and flows through the movable tube 1 as shown in FIG. 1 in the form of a steady flow with a volume flow rate Q. Then, it is apparent that $Q = S_E V_E = S_A V_A$, and for the fluid passing through the main tube 1, the following relation can be derived from the well-known laws of motion:

$$-R_A S_A P_A - R_E S_E P_E + T_W = \rho Q^2 \left(\frac{R_A}{S_A} + \frac{R_E}{S_E}\right) \quad (1)$$

where, $T_W$ is the sum of torques imparted to the fluid by the wall portions of the main tube 1.

Since the flow is a steady flow and the movable tube 1 is held in its stationary state, the following balancing condition is satisfied:

$$-R_A(S_A^* - S_A)P_A - R_E(S_E^* - S_E)P_E$$
$$+ R_A S_A^* P + R_E S_E^* P - T_W + T = 0 \quad (2)$$

where, P is the pressure outside of the movable tube 1, $-T_W$ is reaction against the torque $T_W$, and T is the external torque imparted to the movable tube 1 for balancing the tube 1 and includes therein those torque components produced by the resiliency of the bellows 4 and 5.

From the above Equations 1 and 2, the following equation can be derived:

$$-R_A S_A^*(P_A - P) - R_E S_E^*(P_E - P)$$
$$+ T = \rho Q^2 \left(\frac{R_A}{S_A} + \frac{R_E}{S_E}\right) \quad (3)$$

It will be seen from the above Equation 3 that the flow rate Q can be calculated by measuring the three quantities, T, $P_A$–P and $P_E$–P, provided that the density $\rho$ is already known. It will be understood that, in accordance with the principle of measurement in the present invention, the viscosity of the fluid has utterly no concern with the measurement of the flow rate since the Bernoulli's theorem is not applicable to this case.

By satisfying various conditions, a variety of forms of flowmeters can be constructed in accordance with the present invention. Several examples embodying the basic invention will be described hereunder, but it is to be understood that these examples are shown merely for the illustrative purpose and the invention is in no way limited to such specific examples.

EXAMPLE 1

Example 1 relates to a flowmeter of the structure in which $R_A$ or $R_E$ in FIG. 1 is rendered zero. In case $R_E = 0$, it is apparent that the direction of flow is opposite to that in case $R_A=0$. In case $R_A=0$, the Equation 3 can now be expressed as $$-R_E S_E^*(P_E-P)+T=\rho Q^2 \cdot \frac{R_E}{S_E} \quad (4)$$

and it will be seen that the flow rate Q can be calculated by measuring the two quantities which are the torque T and the differential pressure $P_E-P$. Since in this case the direction of flow at the outlet end A is independent of the Equation 4, the flow at the outlet end A may have any desired direction.

In FIG. 2a and following drawings, like reference numerals are used to denote like parts appearing in FIG. 1. In one form of the flowmeter diagrammatically shown in FIG. 2a, the direction of flow at the outlet end A is parallel with the direction of flow at the inlet end E, while in another form of the flowmeter diagrammatically shown in FIG. 2b, the flowmeter comprises a movable main tube 1 which is substantially L-shaped. Although not shown in the drawing, the axis of rotary displacement may register with the axis of the straight outlet tube portion 3 of the main tube 1, and the point O as described previously may lie at any desired position on a dotted line shown in FIGS. 2a and 2b. The flowmeter having an L-shaped movable tube as shown in FIG. 2b is simplest in the structure, and those satisfying the condition $R_A=0$ will hereinafter be generally called L-shaped movable tube flowmeters or single-arm movable tube flowmeters.

In the L-shaped movable tube flowmeter, the outlet end A of the movable tube 1 is connected to a stationary pipe 3 by means of a bellows 5 as shown in FIG. 2b. However, in a modification diagrammatically shown in FIG. 3, the flowmeter comprises a movable tube 1 of flexible nature which is fixed at the outlet end A to a stationary pipe 3 so that deflection of the tube 1 can cause rotary displacement or swinging movement of a straight inlet tube portion connected to a stationary pipe 2 by a bellows 4 for thereby attaining the function similar to that attained by the embodiment shown in FIG. 2b. In this case, the torque T includes a torque component produced by the stress resulting from the deflection of the tube 1.

Examples 1–1 to 1–3 described below also relate to flowmeters employing therein a flexible tube.

EXAMPLE 1–1

Example 1–1 relates to a flowmeter of the structure in which $R_A=0$ and $P=P_E$. As diagrammatically shown in FIG. 4, the flowmeter comprises an L-shaped movable tube 1 which is bodily sealingly surrounded by a stationary enclosure 7, and a spring means 4 is employed in place of the bellows in the previous embodiments so as to satisfy the above-specified conditions $R_A=0$ and $P=P_E$. Alternatively, a bellows 4 having suitable perforations may be used in lieu of the above spring means. In one form of the flowmeter shown in FIG. 4a, the outlet end A of the movable tube 1 is connected to a stationary pipe 3 by means of a bellows 5, while in another form of the flowmeter shown in FIG. 4b, the movable tube 1 which in this case is a flexible tube is fixed at its outlet end A to a stationary pipe 3. In any of the above cases, the Equation 3 can now be expressed as $$T=\rho Q^2 \frac{R_E}{S_E} \quad (5)$$

and it will be seen that the flow rate Q can be known by measuring only one quantity which is the torque T.

Figure 4A:
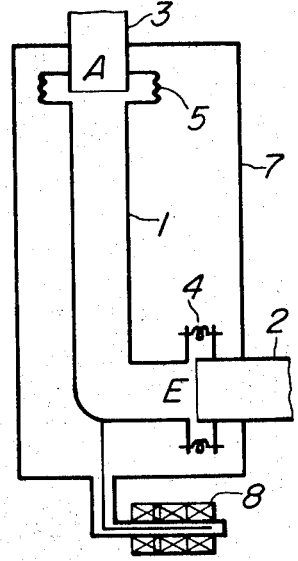
Figure 4B:
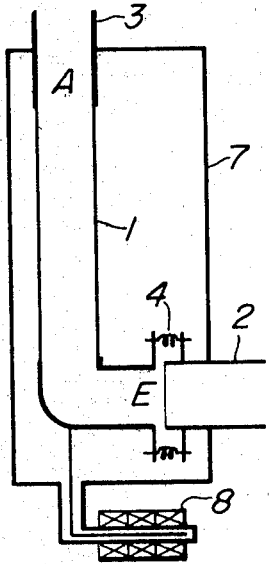

Since the torque T is proportional to rotary displacement or swinging movement of the movable tube 1, the torque T can be easily measured by any suitable means including a differential transformer 8 as shown in FIGS. 4a and 4b. When, for example, it is intended to measure the torque T by a displacement balancing mechanism, means such as the differential transformer may be utilized to electrically detect and indicate the displacement, hence the torque T. An electrostatic method may also be employed in which variation in the capacitance of a condenser may be utilized to electrostatically detect and indicate the displacement, hence the torque T. Further, it is possible to purely mechanically enlarge the displacement to detect and indicate it, hence the torque T, by means of an enlarging mechanism such as a Bourdon gauge. If it is desired to measure the torque T by a force balancing mechanism, an electrical or pneumatic system which acts to provide a force balance with the detected torque T may be used.

EXAMPLE 1–2

Example 1–2 relates to a flowmeter of the structure in which $R_A=0$ and means is provided for the sake of pressure cancellation in the flowmeter. As diagrammatically shown in FIG. 5a, the flowmeter of this form comprises an L-shaped movable tube 1, a bellows 4 connecting the tube 1 to a stationary pipe 2, a bellows 5 connecting the tube 1 to a stationary pipe 3, and an auxiliary bellows 9 connected to the bellows 4 by means of a pressure-equalizing communicating tube 10. Suppose now that the auxiliary bellows 9 has an effective area $S_C^*$ and its axis is spaced a distance $R_C$ from the fixed axis of rotary displacement of the tube 1, and that the condition $$R_C S_C^* = R_E S_E^*$$

is thereby satisfied. Then, both the conditions, that is, $R_A=0$ and pressure cancellation, can be satisfied because the internal pressures in the belows 4 and 9 can be equalized due to the pressure cancellation effect provided by the communicating tube 10 connected therebetween. In this case, the balancing torque T imparted to the tube 1 can be expressed as $$T=R_E S_E^*(P_E-P)+T'$$

where, T' is the torque produced by the resiliency of the bellows 4 and 9 and is proportional to the rotary displacement or swinging movement of the movable tube 1. In this case, the Equation 4 can now be expressed as $$T'=\rho Q^2 \frac{R_E}{S_E} \quad (6)$$

and it will be seen that the flow rate Q can be known by measuring only one quantity which is the torque T'. The torque T' can be easily measured by means such as a differential transformer 8.

Figure 5A:
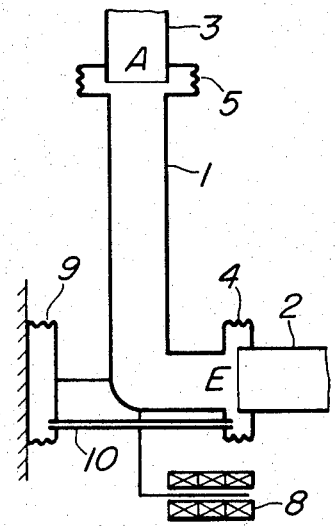
Figure 5B:
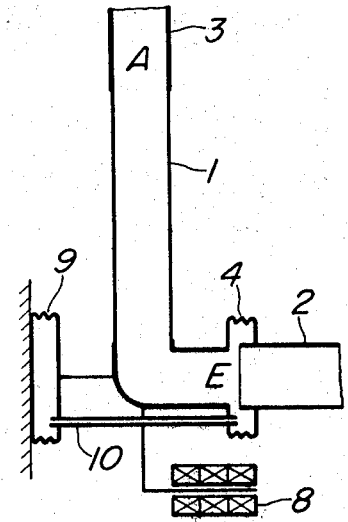

Another form of the flowmeter diagrammatically shown in FIG. 5b employs therein a flexible tube 1 and is substantially similar to that shown in FIG. 5a. In this case, however, the torque T' includes therein an additional torque component produced by the stress resulting from deflection of the flexible tube 1. Since such torque is also proportional to the rotary displacement or swinging movement of the tube 1 at its straight inlet tube portion, the torque T' can be similarly measured by any suitable means such as a differential transformer 8.

EXAMPLE 1–3

Example 1–3 relates to a flowmeter of the structure in which $R_A=0$ and $T=R_E S_E^*(P_C-P)$. This flowmeter is similar to that described in Example 1–2 in that it employs therein an auxiliary bellows 9 having an internal pressure $P_C$. FIG. 6a diagrammatically shows one form of the flowmeter comprising an L-shaped movable tube 1, while FIG. 6b diagrammatically shows another form of the flowmeter comprising a flexible tube 1. In both forms of the flowmeter, pressure regulating means 11 is operatively associated with the auxiliary bellows 9 in order to regulate the pressure in the bellows 9 in a manner that the rotary displacement or swinging movement of the tube 1 detected by a differential transformer 8 is rendered zero for thereby satisfying the above-specified two conditions. In such a case, the Equation 4 can now be expressed as $$R_E S_E^*(P_C - P_E) = \rho Q^2 \frac{R_E}{S_E}$$

or $$S_E^* S_E (P_C - P_E) = \rho Q^2 \quad (7)$$

and it will be seen that the flow rate Q can be known by measuring only one quantity which is the differential pressure $P_C - P_E$. A differential pressure meter 12 is provided to measure the above differential pressure $P_C - P_E$.

EXAMPLE 2

Example 2 relates to a flowmeter of the structure in which $P = P_E$ or $P = P_A$ and which is specifically called a double-arm movable tube flowmeter because of the fact that $R_A \neq 0$ and $R_E \neq 0$. As diagrammatically shown in FIG. 7, the flowmeter of this form comprises a double-arm movable tube 1 which is bodily sealingly surrounded by a stationary enclosure 7, and a spring means 4 in lieu of a bellows is used to connect the tube 1 to a stationary pipe 2 in order to satisfy the condition $P = P_E$. A bellows 5 connects the tube 1 to a stationary pipe 3. In this case, the balancing torque T is produced by the resiliency of the bellows 5 and the spring means 4, and can be measured by means such as a differential transformer 8.

With such an arrangement, the Equation 3 can now be expressed as $$R_A S_A^*(P_E - P_A) + T = \rho Q^2 \left(\frac{R_A}{S_A} + \frac{R_E}{S_E}\right) \quad (8)$$

and it will be seen that the flow rate Q can be known by measuring the two quantities which are the torque T and the differential pressure $P_E - P_A$. A differential pressure meter 12 is provided to measure the differential pressure $P_E - P_A$.

The Equation 8 still holds true in a case in which the Bernoulli's theorem does not hold. However, where the Bernoulli theorem holds good, there is the relation $$P_E - P_A = \frac{1}{2} \rho Q^2 \left(\frac{1}{S_A^2} - \frac{1}{S_E^2}\right) \quad (9)$$

Therefore, by substituting $P_E - P_A$ in the Equation 8 by $P_E - P_A$ in the Equation 9, the following relation can be obtained:

$$T = \rho Q^2 \left\{ \left(\frac{R_A}{S_A} + \frac{R_E}{S_E}\right) - \frac{1}{2} R_A S_A^* \left(\frac{1}{S_A^2} - \frac{1}{S_E^2}\right) \right\} \quad (10)$$

It will thus be seen that the flow rate Q can be known by measuring only one quantity which is the torque T.

EXAMPLE 3

Figure 8:
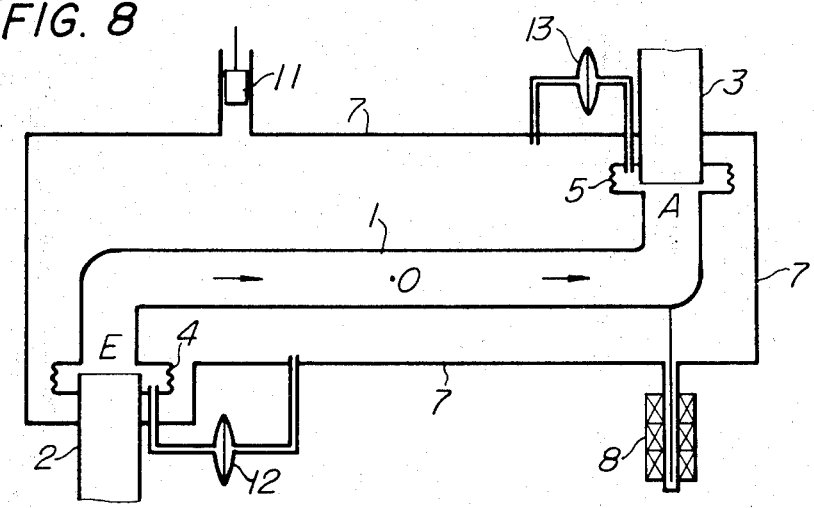

Example 3 relates to a flowmeter of the structure in which the relation $T = 0$ is realized by regulating the pressure outside of the tube. The flowmeter of this form is diagrammatically shown in FIG. 8 and comprises a double-arm movable tube 1 which is bodily sealingly surrounded by a stationary enclosure 7. Pressure regulating means 11 is operatively associated with the flowmeter to regulate the pressure outside of the tube 1 in such a way that, during the flow of a fluid therethrough, the tube 1 takes the same position as that taken by the tube 1 in case $Q = 0$, and so that the relation $T = 0$ can thereby be established. Suppose that the pressure outside of the tube 1 is $P_o$, then the Equation 3 can now be expressed as $$-R_A S_A^*(P_A - P_o) - R_E S_E^*(P_E - P_o)$$

$$= \rho Q^2 \left(\frac{R_A}{S_A} + \frac{R_E}{S_E}\right) \quad (11)$$

and it will be seen that the flow rate Q can be known by measuring the two quantities which are the differential pressures $P_E - P_o$ and $P_A - P_o$. Differential pressure meters 12 and 13 are provided to measure the respective differential pressures $P_E - P_o$ and $P_A - P_o$.

EXAMPLE 4

Figure 9:
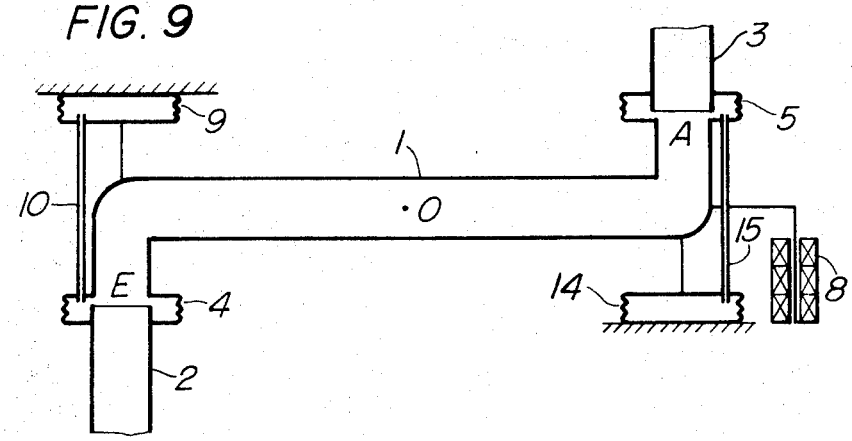

Example 4 relates to a flowmeter of the structure in which means are provided to effect pressure cancellation in the flowmeter. As diagrammatically shown in FIG. 9, the flowmeter comprises a double-arm movable tube 1, bellows 4 and 5 connecting the tube 1 to respective stationary pipes 2 and 3, and auxiliary bellows 9 and 14 connected to the respective bellows 4 and 5 by means of pressure-equalizing communicating tubes 10 and 15. The relation between the bellows 4, 5 and the auxiliary bellows 9, 14 is similar to that shown in Examples 1–2.

Since, in this case, the torque T can be given by the equation $$T = T' + R_A S_A^*(P_A - P) + R_E S_E^*(P_E - P)$$

the Equation 3 can be expressed as $$T' = \rho Q^2 \left(\frac{R_A}{S_A} + \frac{R_E}{S_E}\right) \quad (12)$$

The torque T' is produced by the resiliency of the four bellows and can be measured by means such as a differential transformer 8. It will thus be seen that the flow rate Q can be known by measuring only one quantity which is the torque T'.

EXAMPLE 5

Figure 10:
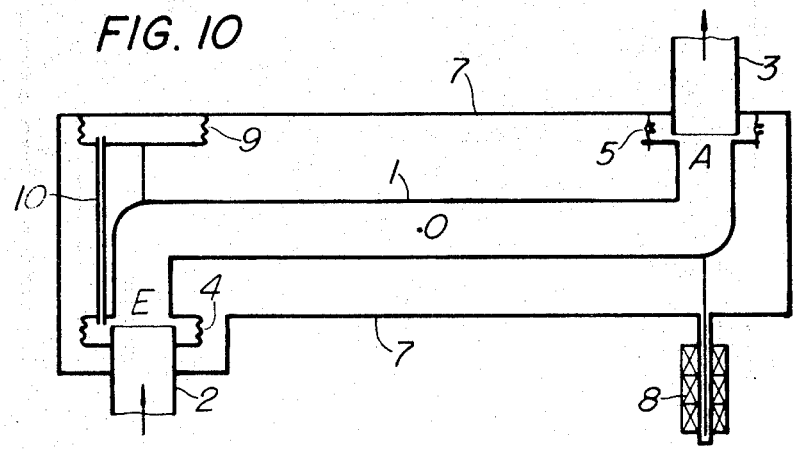

Example 5 relates to a flownmeter of the structure in which $P = P_A$ or $P = P_E$ and means are provided to effect pressure cancellation in the flowmeter. The flowmeter of this form is diagrammatically shown in FIG. 10 and comprises a double-arm movable tube 1 which is bodily sealingly surrounded by a stationary enclosure 7. In this flowmeter, an auxiliary bellows 9 similar to that shown in Example 4 is used and connected to a bellows 4 by a communicating tube 10, and a spring means 5 in lieu of a bellows is employed to connect the tube 1 to a stationary pipe 3. The Equation 12 applies also to this form of the flowmeter, and the flow rate Q can be known by measuring only one quantity which is the torque T'.

EXAMPLE 6

Figure 11:
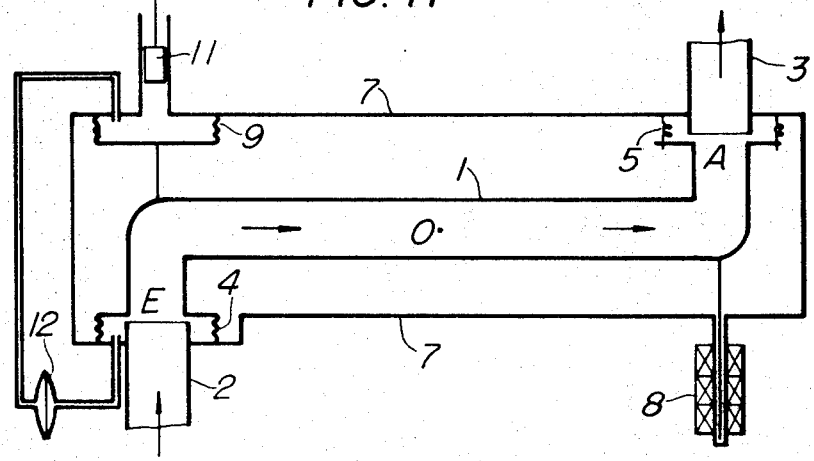

Example 6 relates to a flowmeter of the structure in which $P = P_A$ or $P = P_E$ and $T = R_E S_E^*(P_C - P)$ or $T = R_A S_A^*(P_C - P)$. The flowmeter of this form is diagrammatically shown in FIG. 11 and comprises a double-arm movable tube 1 which is bodily sealingly surrounded by a stationary enclosure 7, a spring means 5 disposed at the outlet end A of the tube 1 to connect the tube 1 to a stationary pipe 3, and a bellows 4 disposed at the inlet end E to connect the tube 1 to a stationary pipe 2. The bellows 4 is connected to an auxiliary bellows 9 by a communicating tube. Pressure regulating means 11 is operatively associated with the auxiliary bellows 9 to vary the pressure in the auxiliary bellows 9 in such a manner that rotary displacement or swinging movement of the tube 1 detected by a differential transformer 8 becomes zero. Suppose now that the above-specified conditions are satisfied when the balancing pressure in the auxiliary bellows is $P_C$, then the Equation 3 can be expressed as $$R_E S_E^*(P_C - P_E) = \rho Q^2 \left(\frac{R_A}{S_A} + \frac{R_E}{S_E}\right) \quad (13)$$

and it will be seen that the flow rate Q can be known by measuring only one quantity which is the differential pressure $P_C = P_E$. A differential pressure meter 12 is provided to measure the differential pressure $P_C - P_E$.

From the foregoing description, it will be appreciated that the present invention provides a movable tube flowmeter of angular momentum type which has many advantages and features over conventional flowmeters. Among many features, the flowmeter according to the present invention has the following notable features:

(1) There is utterly no limitation as to the shape of the main tube except its straight inlet and outlet tube portions.

(2) The flow rate of a fluid can be measured independently of the Bernoulli's theorem which is solely applicable to a viscosity-free perfect fluid. Thus, the flow rate can be measured independently of the viscosity of the particular fluid.

(3) Any constants including the flow coefficient and the like which are to be experimentally determined are not involved in the measurement of the flow rate by the flowmeter.

(4) The flowmeter is the so-called primary flowmeter in which the flow rate is derived by calculation. In other words, the above constants which are to be experimentally determined are not entirely required by the flowmeter.

(5) The flowmeter can be easily constructed to deal with a high flow rate by virtue of the fact that there is utterly no need for elaborate calibration.

What is claimed is:

1. A movable tube flowmeter of the angular momentum type comprising a movable tube having inlet and outlet end portions, said tube comprising an intermediate portion so positioned relative to said inlet and outlet end portions that a fluid flowing from said inlet end portion via said intermediate portion to said outlet end portion must change its direction of flow at least once, said tube being mounted for rotary displacement about a fixed axis in response to variation in the angular momentum of a fluid flowing therethrough, and a pair of flexible joint elements constructed to permit flow of the fluid therethrough and respectively connecting said inlet and outlet end portions of said movable tube to stationary inlet and outlet pipes in a manner to permit the rotary displacement of said movable tube; said flowmeter operating in accordance with the equation $$-R_A S_A{}^*(P_A-P)-R_E S_E{}^*(P_E-P)+T=\rho Q^2\left(\frac{R_A}{S_A}+\frac{R_E}{S_E}\right)$$

where $R_E$ is the distance, which may be 0, between said fixed axis and said inlet end portion; $R_A$ is the distance, which may be 0, between said fixed axis and said outlet end portion; $S_E$ is the cross sectional area of said inlet end portion; $S_A$ is the cross sectional area of said outlet end portion; $S_E{}^*$ is the effective cross sectional area of the flexible joint element at said inlet end portion; $S_A{}^*$ is the effective cross sectional area of the flexible joint element at said outlet end portion; $P_E$ is the fluid pressure at said inlet end portion; $P_A$ is the fluid pressure at said outlet end portion; P is the pressure outside of said movable tube; T is the external torque applied to said movable tube to balance it against said rotary displacement; $\rho$ is the density of said fluid; and Q is the flow rate of said fluid; means for cancelling all but one of the quantities $(P_E-P)$, $(P_A-P)$; and, means for measuring the uncanceled one of said quantities to determine said flow rate Q independently of the viscosity of said fluid.

2. A flowmeter according to claim 1 wherein at least one of said flexible joint elements comprises a bellows.

3. A flowmeter according to claim 1 wherein said movable tube is L-shaped between said inlet and outlet end portions.

4. A flowmeter according to claim 1 wherein at least one of said flexible joint elements comprises a flexible tube integral with said movable tube.

5. A flowmeter according to claim 1 wherein said movable tube is surrounded by and sealed within stationary enclosure means, said flexible joint element at one of said inlet and outlet end portions comprising a bellows, and said flexible element at the other end portion being constructed to equalize the pressure at said other end portion with the pressure outside of said movable tube.

6. A flowmeter according to claim 1 wherein said movable tube is surrounded by and sealed within stationary enclosure means, said flexible joint element at one of said inlet and outlet end portions comprising a flexible tube integral with said movable tube, and said flexible joint element at the other end portion being constructed to equalize the pressure at said other end portion with the pressure outside of said movable tube.

7. A flowmeter according to claim 1 wherein at least one of said flexible joint elements comprises a bellows, auxiliary bellows means interconnected to the bellows comprising said flexible joint elements, said auxiliary bellows being arranged to exert forces on said movable tube, and means for regulating the pressure in said auxiliary bellows for returning said movable tube to its zero position.

8. The flowmeter of claim 1, including means for regulating the pressure outside of said movable tube to vary forces exerted on said tube thereby to continuously hold said movable tube in its zero position.

9. A flowmeter according to claim 1 wherein said movable tube is surrounded by and sealed within stationary enclosure means, said flexible joint elements at the inlet and outlet end portions of said movable tube comprising means for canceling the pressure at said end portions of said movable tube respectively.

10. A flowmeter according to claim 1, wherein said movable tube is surrounded by and sealed within stationary enclosure means, said flexible joint element at one of the inlet and outlet end portions of said movable tube comprising means for canceling the pressure at said one end portion, said flexible joint at the other end portion of said movable tube comprising a bellows, an auxiliary bellows interconnected to the first mentioned bellows, and means for regulating the pressure in said auxiliary bellows for returning said movable tube to its zero position.

References Cited

UNITED STATES PATENTS

| | | | |
|---|---|---|---|
| 2,804,771 | 9/1957 | Brown | 73—228 |
| 2,897,672 | 8/1959 | Glasbrenner et al. | 73—228 |
| 3,096,646 | 7/1963 | Peirce | 73—228 |
| 3,164,019 | 1/1965 | Burgwald et al. | 73—228 |
| 3,203,241 | 8/1965 | Genthe | 73—228 |
| 3,206,978 | 9/1965 | Aronow | 73—228 |

FOREIGN PATENTS

| | | |
|---|---|---|
| 223,962 | 7/1958 | Australia. |
| 1,157,475 | 12/1957 | France. |
| 118,323 | 1959 | Russia. |

JAMES J. GILL, Primary Examiner